Jan. 13, 1942. D. M. POTTER 2,270,141
FLOWMETER
Filed Nov. 12, 1938
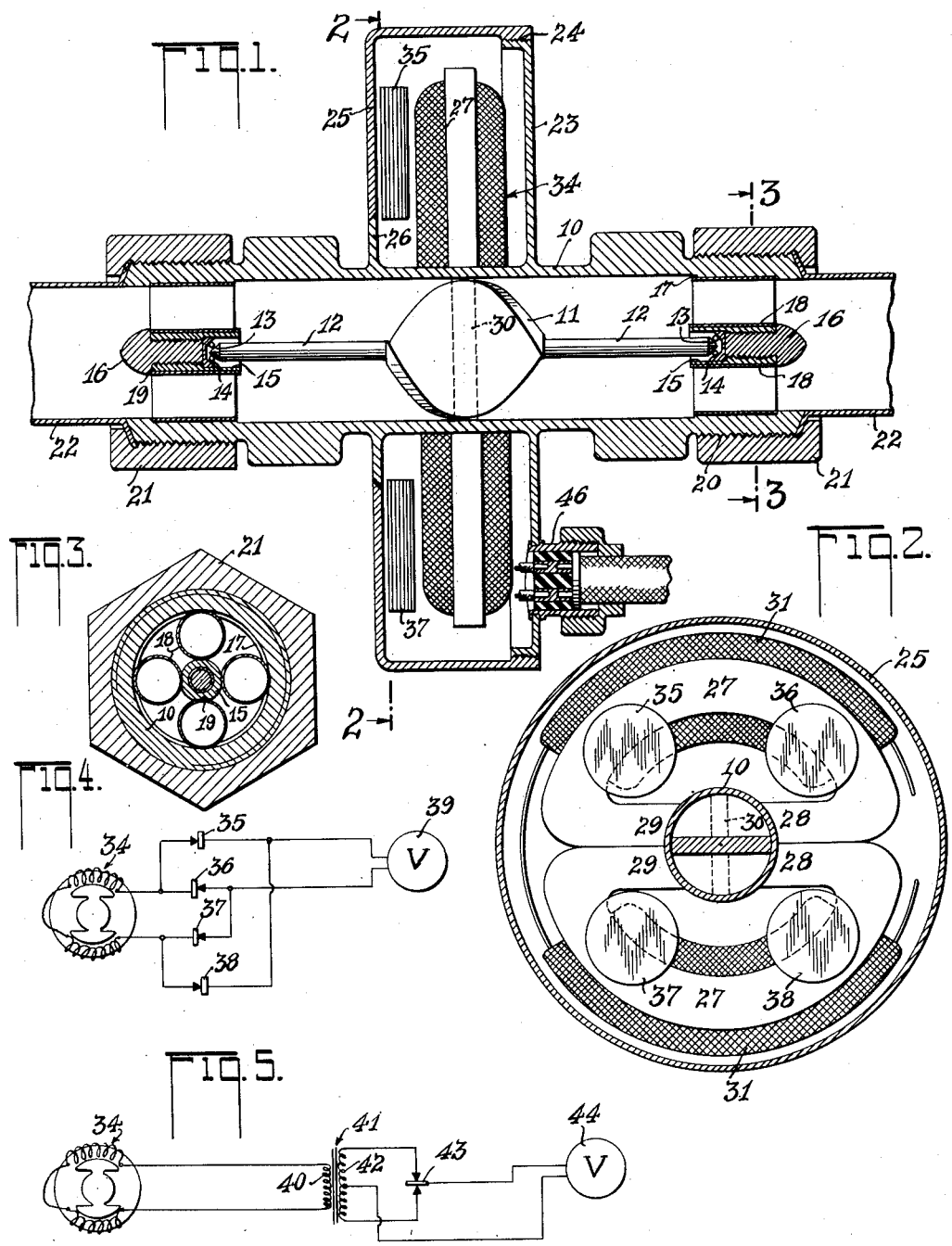
INVENTOR
DAVID M. POTTER
BY
ATTORNEY Patented Jan. 13, 1942

2,270,141

UNITED STATES PATENT OFFICE 2,270,141

FLOWMETER

David M. Potter, Drexel Hill, Pa., assignor to Breeze Corporations, Inc., Newark, N. J., a corporation of New Jersey Application November 12, 1938, Serial No. 239,975

15 Claims. (Cl. 73—231)

This invention relates to flowmeters, and comprises particularly a novel form of device for measuring the rate of flow of either liquids or gases. In the embodiment chosen for illustration, the invention is particularly adapted for use as a fluid flowmeter for aircraft engines.

It is an object of the invention to improve the mounting and operation of the rotors of measuring apparatus of the type employed to measure the rate of flow of fluids.

In this connection, it is also an object of the invention to provide a mounting for the rotors of flowmeters or the like, that will serve both to mount the rotor and eliminate turbulence of fluid flow adjacent thereto.

From this aspect as well as that of registering the rate of fluid flow, it is an object of the present invention to provide a rotor mounting affording highly accurate operation of the mechanism.

In attaining these results, it is an object of the present invention to provide rotor mounting means affording, in conjunction with the operating parts of the mechanism, an instrument which will withstand shock incident to handling and service operations and which at all times will operate with the highest precision and accuracy.

Further objects will be apparent from a reading of the annexed specification and claims, together with an examination of the drawing, in which:

Fig. 1 is a longitudinal section through a flowmeter;

Fig. 2 is a section on the line 2—2 of Fig. 1;

Fig. 3 is a section on the line 3—3 of Fig. 1;

Fig. 4 is a wiring diagram for the apparatus; and

Fig. 5 is a wiring diagram of an alternative arrangement.

The flow responsive instrument, per se, comprises a barrel or conduit 10 within which is disposed a helical vane 11 in the form of a twisted ribbon, any element of the surface of the vane lying at approximately 45° to the fluid path through the conduit. The ends of the vane 11 are formed as spindles 12, coned at their ends as at 13 to engage in small ball bearings 14 contained within sleeves 15 into the outer ends of which are inserted plugs 16 each having a streamlined nose. Axially coextensive with the sleeves 15, counterbores 17 are formed in the barrel, and, as best shown in Fig. 3, a plurality of small cylinders of thin and resilient metal are sprung into place to comprise spokes by which the sleeves are held central within the barrel, these cylinders being indicated at 18. The cylinders 18 seat in arcuate recesses 19 formed in the outer surface of the sleeves 15, so that the latter are held in place. The cylinders 18, as well as providing support for the bearing sleeves 15, also comprise guide vanes by which fluid entering and leaving the barrel 10 is held to a straight path past the vane 11. The ends of the barrel 10 are provided with screw threads 20 upon which union nuts 21 may be threaded to clamp pipes 22 to the conduit for fluid ingress and fluid egress.

The barrel 10 is preferably made from nonmagnetic material and is provided with a rigid flange 23 formed at its outer periphery with threads 24, and engaging with the threads 24 is a cover element 25 having a central perforation, embracing the barrel 10 and bearing upon a small flange 26 integral with the barrel. Thus, an annular space is defined between the elements 23 and 25. Within this space substantially semi-circular pole elements 27 are disposed, each having pole pieces 28 and 29 lying close to the outer surface of the barrel 10 so that they are in electro-magnetic relation with a permanent magnet 30 secured within the material of the vane 11. This magnet is a bar magnet, and may be made from conventional material, or from some of the more recently developed magnetic materials which have great magnetic stability. Preferably, the magnet 30 is inserted into a cross drilling in the vane 11, so that it is wholly embraced by the material of the vane and offers no obstruction, of itself, to fluid flow. The pole pieces 27 are provided with windings 31, and the elements 27 to 31, inclusive, comprise a small alternating current generator whose output, in either or both frequency and E. M. F., is proportional to the rate of fluid flow through the barrel 10; the frequency and E. M. F. developed by the generator is proportional to the rate of fluid flow.

Fig. 4 shows one arrangement by which the voltage developed by the generator may readily be measured. The generator, indicated in its entirety as 34, is connected through a plurality of rectifiers 35, 36, 37 and 38 to a direct current voltmeter 39 which may be calibrated in any suitable manner to indicate rate of fluid flow. For instance, if the device is used for measuring gasoline flow in an aircraft installation, the voltmeter may be calibrated in gallons per hour or in pounds of fluid per hour. The several rectifiers 35 to 38 are preferably of the copper oxide type and may be housed in the instrument as indicated in Figs. 1 and 2. The four rectifiers indicated in Fig. 4 provide full wave rectification of the power generated by the generator 34, and the voltage delivered to the voltmeter 39 will suffer a certain diminution as a result of the length of connecting wire and the resistance through the rectifiers. However, since it is contemplated that the generator itself have a substantial resistance of the order of 2,000 ohms or more, and that the voltmeter likewise have a substantial resistance, the length of wires used for connecting the generator and voltmeter will have a relatively small effect upon calibration of the instrument.

Fig. 5 shows an alternative arrangement wherein the generator 34 delivers its power output to the primary winding 40 of a saturated core transformer 41, the secondary 42 of which is split and is connected in the usual manner to a double wave copper oxide rectifier 43 and to a direct current voltmeter 44. In this case, the transformer 41 may be placed adjacent the voltmeter 44, and the length of wires connecting the generator with the transformer is immaterial, for the transformer, being of the saturated core type, is responsive only to frequency. In other words, the voltage output of the transformer is proportional to the frequency input thereto, and accordingly, since the frequency is proportional to the R. P. M. of the vane 11, the voltage output from the transformer will likewise be proportional thereto, this voltage being measureable directly upon a D. C. voltmeter.

Certain flowmeter installations are subject to wide variations in temperature which, unless compensation is made, will produce erroneous indications of rate of fluid flow. Accordingly, I incorporate in the flowmeter itself, automatic temperature compensation which may take either one of several forms. In one method of effecting automatic temperature compensation, I utilize a wire in the windings of the generator whose increase in resistance, with changes in temperature, is proportional to the increase in volume of the fluid to be measured. For instance, the volume of gasoline increases approximately 3.4% per unit weight with a 50° F. rise in temperature, which would tend to make the meter register 3.4% too high. Now, if the windings be formed from a metal whose increase in resistance is approximately 3.4% for the same temperature change, the output of the generator will be lessened with increases in temperature in the same proportion as the density of the fluid is decreased, whereby, for any unit of time, and regardless of temperature, the weight of fluid will be accurately measured. Certain alloys of copper and zinc or copper and aluminum may be proportioned so as to obtain the desired 3.4% change in resistance for a 50° F. temperature change when a fluid such as gasoline is to be measured, and adjustments may be made in the composition of the material to adapt it for use with any other fluid having a different coefficient of expansion.

An alternative means of temperature compensation would comprise fabricating the vane 11 from a bimetallic strip so that, with increase in temperature, and consequent decrease in density of the fluid, the spiral vane would tend to straighten out and would make less turns per unit of volume passing through the flowmeter, but would make the same number of turns per unit of weight passing through the flowmeter.

Referring again to the instrument shown in Fig. 1, it is preferred that the generator 34 and the rectifiers 35 to 38 be embedded in a suitable sealing compound, and electrical connections therefrom may be made through a conventional detachable plug organization shown at 46. It might be here mentioned that the design of the generator 34 should be such that small output is obtained—such an instrument which has been constructed and successfully used produces an output of about 5 volts and 1 milliampere under normal rating conditions.

Although the instrument shown in the drawings is designed particularly as a fluid flowmeter, the same device with suitable changes in size and form is adapted for use as an airspeed indicator or for a log to indicate the speed of water craft.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a mechanism comprising a hollow support, a bearing carrier therein, and a plurality of annular spoke elements therebetween axially parallel to the bearing carrier, at least one of said elements comprising an annular spring insertible after assembly of the other elements and carrier to retain the carrier in fixed position in the support hollow, said carrier and support having recesses within which said elements engage.

2. In a mechanism, a hollow support comprising an annular wall, a bearing carrier of smaller diameter than the wall annulus having segmental recesses in its periphery, and diametrically deformable spring cylinders having a free diameter greater than the distance between said wall and the bottoms of said recesses, when the carrier is concentric with the wall annulus, inserted between the wall and carrier and engaging said carrier recesses.

3. In a mechanism, a hollow support comprising an annular wall, a cylindrical bearing carrier concentric with and smaller in diameter than the wall annulus, and a plurality of diametrically deformable hollow spring cylinders having a free diameter greater than the difference in radius of said wall and carrier when the latter are concentric, said cylinders being sprung into the space between the wall and carrier in axially parallel relation thereto and contacting the surfaces of said wall and carrier along cylindrical elements thereof.

4. In a rotor mounting for measuring apparatus of the class wherein the rotor is mounted for fluid actuation thereof in a conduit upon rotor carrying means disposed in said conduit coaxially with and extending from said rotor, the combination with the rotor carrying means and the conduit, of means arranged therebetween for holding the rotor carrying means in concentric relation with the conduit and comprising a series of thin annular metallic elements ring-like in cross-section having openings extending therethrough in the direction of the length of the conduit, the series of elements before association thereof with the rotor carrying means and the conduit each having a diameter greater than the distance between said rotor carrying means and conduit when the latter are concentric, said elements being deformed diametrically thereof and sprung between the rotor carrying means and the conduit into engagement therewith.

5. In a rotor mounting for measuring apparatus of the class wherein the rotor is mounted for fluid actuation thereof in a conduit upon rotor carrying means disposed in said conduit co-axially with and extending from said rotor, the combination with the rotor carrying means and the conduit, of means arranged therebetween for holding the rotor carrying means in concentric relation with the conduit and comprising a series of thin annular metallic elements ring-like in cross-section having openings extending therethrough in the direction of the length of the conduit, the series of elements being of cylindrical tubular form and before association thereof with the rotor carrying means and the conduit each having a diameter greater than the distance between said rotor carrying means and conduit when the latter are concentric, said elements being deformed diametrically thereof and sprung between the rotor carrying means and the conduit into engagement therewith.

6. In a rotor mounting for measuring apparatus of the class wherein the rotor is mounted for fluid actuation thereof in a conduit upon rotor carrying means disposed in said conduit co-axially with and extending from said rotor, the combination with the rotor carrying means and the conduit, of means arranged therebetween for holding the rotor carrying means in concentric relation with the conduit and comprising a plurality of thin annular metallic elements ring-like in cross-section having openings extending therethrough in the direction of the length of the conduit, one of said means being positioned in recesses formed in the other of said means, the plurality of elements before association thereof with the rotor carrying means and the conduit each having a diameter greater than the distance between said rotor carrying means and conduit when the latter are concentric, said elements being deformed diametrically thereof and sprung between the rotor carrying means and the conduit into engagement therewith.

7. In a rotor mounting for measuring apparatus of the class wherein the rotor is mounted for fluid actuation thereof in a conduit upon rotor carrying means disposed in said conduit co-axially with and extending from said rotor, the combination with the rotor carrying means and the conduit, of means arranged therebetween for holding the rotor carrying means in concentric relation with the conduit and comprising a plurality of thin annular metallic elements ring-like in cross-section having openings extending therethrough in the direction of the length of the conduit, the plurality of elements before association thereof with the rotor carrying means and the conduit each having a diameter greater than the distance between said rotor carrying means and conduit when the latter are concentric, said elements being deformed diametrically thereof and sprung between the rotor carrying means and the conduit into engagement therewith upon the interior wall of the conduit and the walls of recesses formed in the rotor carrying means in spaced relation about the same.

8. In a rotor mounting for measuring apparatus of the class wherein the rotor is mounted for fluid actuation thereof in a conduit upon rotor carrying means disposed in said conduit co-axially with and extending from said rotor, the combination with the rotor carrying means and the conduit, of means arranged therebetween for holding the rotor carrying means in concentric relation with the conduit and comprising a series of thin annular metallic elements ring-like in cross-section having openings extending therethrough in the direction of the length of the conduit, the series of elements being of cylindrical tubular form and before association thereof with the rotor carrying means and the conduit each having a diameter greater than the distance between said rotor carrying means and conduit when the latter are concentric, said elements being deformed diametrically thereof and sprung between the rotor carrying means and the conduit into engagement therewith upon the interior wall of the conduit and the walls of recesses formed in the rotor carrying means in spaced relation about the same.

9. In a rotor mounting for measuring apparatus of the class wherein the rotor is mounted for fluid actuation thereof in a conduit upon spaced rotor carrying means disposed in said conduit co-axially with and extending from opposite ends of said rotor, and fluid straightening vanes are provided in the conduit adjacent the rotor, the combination with the conduit and the rotor carrying means, of means forming said vanes and holding the rotor and its carrying means in concentric relation with the conduit, said vane forming means comprising spaced series of thin annular metallic elements ring-like in cross-section having fluid conducting openings through the same, the spaced series of elements being sprung diametrically thereof between and engaged with the conduit and the rotor carrying means in positions such that said openings extend through the elements in the direction of the length of said conduit.

10. In a rotor mounting for measuring apparatus of the class wherein the rotor is mounted for fluid actuation thereof in a conduit upon spaced rotor carrying means disposed in said conduit co-axially with and extending from opposite ends of said rotor, and fluid straightening vanes are provided in the conduit adjacent the rotor, the combination with the conduit and the rotor carrying means, of means forming said vanes and holding the rotor and its carrying means in concentric relation with the conduit, said vane forming means comprising spaced series of thin annular metallic elements ring-like in cross-section having fluid conducting openings through the same, the elements being of cylindrical tubular form and sprung diametrically thereof between and engaged with the conduit and the rotor carrying means in positions such that said openings extend through the elements in the direction of the length of said conduit.

11. In a rotor mounting for measuring apparatus of the class wherein the rotor is mounted for fluid actuation thereof in a conduit upon spaced rotor carrying means disposed in said conduit co-axially with and extending from opposite ends of said rotor, and fluid straightening vanes are provided in the conduit adjacent the rotor, the combination with the conduit and the rotor carrying means, of means forming said vanes and holding the rotor and its carrying means in concentric relation with the conduit, said vane forming means comprising spaced series of thin annular metallic elements ring-like in cross-section having fluid conducting openings through the same, the spaced series of elements being sprung diametrically thereof between and engaged with the conduit and the rotor carrying means, the diametrically sprung elements bearing against spaced shouldered interior wall portions of the conduit and being in positions such that said openings extend through the elements in the direction of the length of said conduit and said shouldered interior wall portions prevent accidental displacement of said elements, the rotor carrying means and the rotor longitudinally of the conduit.

12. In a rotor mounting for measuring apparatus of the class wherein the rotor is mounted for fluid actuation thereof in a conduit upon spaced rotor carrying means disposed in said conduit co-axially with and extending from opposite ends of said rotor, and fluid straightening vanes are provided in the conduit adjacent the rotor, the combination with the conduit and the rotor carrying means, of means forming said vanes and holding the rotor and its carrying means in concentric relation with the conduit, said vane forming means comprising spaced pluralities of thin annular metallic elements ring-like in cross-section having fluid conducting openings through the same, the spaced pluralities of elements being sprung diametrically thereof between and engaged with the conduit and the rotor carrying means, the diametrically sprung elements bearing against spaced shouldered interior wall portions of the conduit and against the walls of recesses formed in the rotor carrying means in spaced relation about the same, the elements of the spaced pluralities thereof being in positions such that said openings extend through the elements in the direction of the length of said conduit and said shouldered wall portions and said recesses prevent accidental displacement of said elements, the rotor carrying means and the rotor longitudinally and transversely of said conduit.

13. In a rotor mounting for measuring apparatus of the class wherein the rotor is mounted for fluid actuation thereof in a conduit upon spaced rotor carrying means disposed in said conduit co-axially with and extending from opposite ends of said rotor, and fluid straightening vanes are provided in the conduit adjacent the rotor, the combination with the conduit and the rotor carrying means, of means forming said vanes and holding the rotor and its carrying means in concentric relation with the conduit, said vane forming means comprising spaced series of thin annular metallic elements ring-like in cross-section having fluid conducting openings through the same, the spaced series of elements being of elongated cylindrical tubular form and sprung diametrically thereof between and engaged with the conduit and the rotor carrying means, the diametrically sprung elements bearing against spaced elongated shouldered interior wall portions of the conduit and against the walls of elongated recesses formed in the rotor carrying means in spaced relation about the same, the elements of the spaced series thereof being in positions such that said openings extend through the elements in the direction of the length of said conduit and said shouldered wall portions and said recesses prevent accidental displacement of said elements, the rotor carrying means and the rotor longitudinally and transversely of said conduit.

14. In a rotor mounting for measuring apparatus of the class wherein the rotor is mounted for fluid actuation thereof in a conduit upon spaced rotor carrying means disposed in said conduit co-axially with and extending from opposite ends of said rotor, and fluid straightening vanes are provided in the conduit adjacent the rotor, the combination with the rotor carrying means and outwardly shouldered spaced annular counterbored portions of the conduit formed interiorly thereof to extend around said rotor carrying means in spaced relation therewith, of means forming said vanes and holding the rotor and its carrying means in the conduit concentrically therewith, said vane forming means comprising spaced series of thin annular metallic elements ring-like in cross-section having fluid conducting openings through the same, the spaced series of elements being sprung diametrically thereof between and engaged with the rotor carrying means and the annular counterbored portions of the conduit in positions such that said openings extend in the direction of the length of the conduit and the outwardly disposed shoulders of said counterbored portions prevent accidental displacement of said elements, the rotor carrying means and the rotor longitudinally of the conduit.

15. In a rotor mounting for measuring apparatus of the class wherein the rotor is mounted for fluid actuation thereof in a conduit upon spaced cylindrical rotor carrying means disposed in said conduit co-axially with and extending from opposite ends of said rotor, and fluid straightening vanes are provided in the conduit adjacent the rotor, the combination with the rotor carrying means and outwardly shouldered spaced annular counterbored portions of the conduit formed interiorly thereof to extend around said rotor carrying means in spaced relation therewith, of means forming said vanes and holding the rotor and its carrying means in the conduit concentrically therewith, said vane forming means comprising spaced series of thin annular metallic elements ring-like in cross-section having fluid conducting openings through the same, the elements being of cylindrical tubular form and sprung diametrically thereof between and engaged with the rotor carrying means and the annular counterbored portions of the conduit in positions such that said openings extend in the direction of the length of the conduit and the outwardly disposed shoulders of said counterbored portions prevent accidental displacement of said elements, the rotor carrying means and the rotor longitudinally of the conduit.

DAVID M. POTTER.